(12) United States Patent
Tsukamoto et al.

(10) Patent No.: US 6,531,847 B1
(45) Date of Patent: Mar. 11, 2003

(54) SAFETY METHOD, DEVICE AND SYSTEM FOR AN ENERGY STORAGE DEVICE

(75) Inventors: Hisashi Tsukamoto, Saugus, CA (US); Clay Kishiyama, Valencia, CA (US)

(73) Assignee: Quallion LLC, Sylmar, CA (US)

( * ) Notice: Subject to any disclaimer, the term of this patent is extended or adjusted under 35 U.S.C. 154(b) by 0 days.

(21) Appl. No.: 10/014,757

(22) Filed: Nov. 7, 2001

(51) Int. Cl.$^7$ .............................................. H01M 10/46
(52) U.S. Cl. ........................................................ 320/135
(58) Field of Search ................................ 320/118, 124, 320/125, 127, 129, 131, 132, 135, 136, 150, 155, 161, 164, 147

(56) References Cited

U.S. PATENT DOCUMENTS

| | | |
|---|---|---|
| 5,478,667 A | 12/1995 | Shackle et al. |
| 5,625,273 A | 4/1997 | Fehling et al. |
| 5,684,663 A | 11/1997 | Mitter |
| 5,766,793 A | 6/1998 | Kameish et al. |
| 5,898,356 A | 4/1999 | Gascoyne et al. |
| 6,127,438 A | 10/2000 | Hasegawa et al. |
| 6,172,482 B1 | 1/2001 | Eguchi |
| 6,210,824 B1 | 4/2001 | Sullivan et al. |
| 6,242,893 B1 | 6/2001 | Freedman |
| 6,252,762 B1 | 6/2001 | Amatucci |
| 6,268,713 B1 | 7/2001 | Thandiwe |

*Primary Examiner*—Edward H. Tso
(74) *Attorney, Agent, or Firm*—M. Elizabeth Bush; David Comarow, Esq.

(57) ABSTRACT

A method, device and system is disclosed for rapidly and safely discharging remaining energy stored in an electrochemical battery 104 in the event of an internal short circuit or other fault. In its best mode of implementation, if a sensor 116 detects one or more parameters such as battery temperature 204 or pressure 206, exceeding a predetermined threshold value 334, the terminals 144 of the battery or cell are intentionally short-circuited external to the battery through a low or near zero resistance load 150 which rapidly drains energy from the battery 104. The rate energy is drained via the external discharge load 150 may be controlled with an electronic circuit 136 responsive to factors such as state of charge and battery temperature. Devices such as piezoelectric and Peltier devices 300, may also be used as emergency energy discharge loads.

67 Claims, 9 Drawing Sheets

SAFETY METHOD, DEVICE AND SYSTEM FOR AN ENERGY STORAGE DEVICE

REFERENCE TO PRIOR-FILED APPLICATIONS

None.

FIELD OF THE INVENTION

The invention relates generally to electrochemical storage cells (hereinafter referred to as "batteries"), and more particularly to safety circuits and systems to rapidly drain energy from a battery in the event of a fault or other malfunction.

BACKGROUND OF THE INVENTION

Batteries are now in use in a wide range of applications. This range of applications is expected to increase in the future as storage battery technology, particularly energy density, continues to improve. In recent years, implanted biomedical batteries have become important for powering so-called bionic devices such as cochlear implants, neuro-muscular stimulators, cardiac pacemakers and defibrillators and artificial organs. In addition, batteries have become an essential power source in a wide range of portable electronic devices including computers, personal information managers, radio telephones ("cellular telephones"), global positioning satellite (GPS) devices and other devices that combine the functions of the foregoing. The safety of these devices is paramount as the explosion of a battery in any of these devices could cause injury and death.

Batteries may present certain safety problems under a variety of circumstances. These potential problems can become more acute, even life threatening, when they are implanted in a human being. These problems may include internal short-circuits, over-pressure leading to bulging enclosures, electrolyte leaks, explosion, over-heating and combustion. Such faults can result from both internal and external factors. They cannot be tolerated in any implanted battery, and could lead to serious safety problems in any application.

The present invention is fundamentally an emergency energy drain or "dump" system. That is, in the event of a serious fault such as an internal short circuit, the remaining energy in the battery is quickly discharged by diverting it to a discharge radiator or sink acting to safely dissipate or absorb the heat generated by the current so diverted. While it is commonly accepted in the art that rapidly draining a battery would cause it to dangerously increase its heating, tests have shown that this counter-intuitive approach is highly effective in preventing dangerous over-heating and/or rupture of batteries which experience an internal short circuit.

The present invention is particularly suited for human-implantable batteries, however may be applied to any electrochemical storage device, or even inertial energy storage devices such as flywheels.

DESCRIPTION OF RELATED ART

Battery safety circuits and devices in general are widely used in both primary (disposable) and secondary (rechargeable) batteries and charging circuits. The circuits typically limit charging and discharging, or disconnect a battery in the event of over-heating or over-pressure in the battery. These devices are intended to prevent real-world failures, but are also designed to meet certain industry and regulatory test requirements such as nail penetration and mechanical crush tests.

U.S. Pat. No. 6,210,824 issued to Sullivan, et al., for example, discloses an end-cap incorporating a pressure sensitive switch intended to disconnect the battery from a circuit in the event pressure inside the battery casing becomes excessive.

Similarly, U.S. Pat. No. 5,766,793 issued to Kameishi et al. discloses a bi-metal plate that bends when heated due to overcharging or short circuiting, breaking the external circuit.

U.S. Pat. No. 6,242,893 issued to Freedman discloses a battery charging circuit which interrupts the charging or discharging of a battery to prevent over-charging or over-discharging.

U.S. Pat. No. 6,268,713 issued to Thandiwe discloses a method wherein a battery charger controller (circuit) detecting a fault isolates one or more batteries while simultaneously notifying a user or host device.

U.S. Pat. No. 5,898,356 issued to Gascoyne et al. discloses a thermally-activated switch which by-passes a cell with an open circuit.

U.S. Pat. No. 6,172,482 issued to Eguchi discloses a battery protection circuit comprising a thermally-activated fuse intended to prevent over-charging.

U.S. Pat. No. 5,684,663 issued to Mitter discloses a resetable circuit intended to protect a battery pack from an external short by disconnecting the battery pack from the faulty load by means of a control FET until the fault is cleared.

Similarly, U.S. Pat. No. 5,625,273 issued to Fehling et al. discloses a latching circuit intended to disconnect an external device from the battery in the event of sensing a fault (over-heating, voltage reversal or short circuit).

Each of the foregoing approaches fails to mitigate over-heating caused by a short circuit internal to a battery (as opposed to battery heating caused by an external short). Such faults are generally addressed in the industry by a so-called "safety separator" made of a porous material that, when heated to a specific temperature, fuses (becomes impermeable) and electrically isolates a cathode from an anode, shutting down the electrochemical reaction. For example, U.S. Pat. No. 6,127,438 issued to Hasegawa, et al. discloses a safety separator made of polyethylene microporous film with high tensile strength, a 20–80%, porosity, a gel fraction of 1% or more and an average pore diameter determined by the permeation method of 0.001–0.1 $\mu$m, and a method for producing same. The separator so disclosed fuses (becomes impermeable) at between 100° C. (212° F.) and 160° C. (320° F.). Additionally, the separator disclosed is claimed to have a breaking time of 20 seconds in silicone oil at 160° C. (320° F.). There are numerous other variations of safety separators used in the industry. A short circuit resulting from faulty manufacture, however, such as a contaminant lodged in the components of a battery during assembly creating a hole in the separator, growth of dendrites within the battery or crushing or penetration of the battery can defeat the safety features of the safety separator, causing a runaway condition and overheating.

The large flow of current through such an internal short can cause heat and pressure to rise dramatically inside the battery. Each of the foregoing prior art approaches (both the use of safety circuits and safety separators) further suffers from the problem that the energy stored in the battery may continue to over-heat the battery, causing a build-up in pressure, explosion or combustion resulting in rupture of the battery enclosure, and/or leaks of electrolyte. Thus, a means of preventing a runaway condition in the event of the failure or breach of a safety separator would be highly beneficial.

U.S. Pat. No. 5,478,667 issued to Shackle, et al. discloses a heat dissipation scheme in which the current collectors of a battery serve as a heat sink to help dissipate to the atmosphere heat generated inside the battery. However, such an arrangement is impractical for small batteries, especially those that are medically implanted. Moreover, such a thermal sink would likely not dissipate heat quickly enough in the event of an internal short circuit, especially one caused by a sudden penetration or crushing event. Thus, a passive heat sink such as described in the '667 patent would likely not prevent a runaway condition and may not be adequate to prevent electrolyte leaks, explosions or even combustion.

A better approach not found in the prior art is to provide an emergency energy drain method or device intended to intentionally rapidly deplete stored energy to minimize further battery heating and resulting damage.

SUMMARY OF THE INVENTION

The best mode of the present invention comprises a control circuit and sensors which detect faults such as over-heating and over-pressure. If such conditions persist, even if the external load is disconnected, electrolyte leakage, explosion and combustion can occur. Therefore, once the control circuit detects conditions above predetermined thresholds, it connects the faulty cell or cells to an energy "dump" or discharge device (hereinafter referred to as "discharge device") such as a heat sink or heat dissipation device such as a low resistance coil. Since the preferred embodiment of the claimed device is automatic, it is advantageous to provide a notification that it has been activated. This is particularly true when life-dependent devices (such as implanted cardiac defibrillators) will necessarily need to be replaced or serviced without delay.

The present invention can also be implemented as a manually-activated system.

In addition, the present invention is equally applicable to related energy storage devices such as super capacitors and so-called "asymmetric hybrid devices" (see e.g. U.S. Pat. No. 6,252,762 issued to Amatucci).

Accordingly, it is an object of the present invention to provide a safety device and method to prevent the dangerous build-up of heat and pressure in batteries which experience internal short circuits.

A more particular object of the present invention is to provide a means for draining rapidly and safely remaining stored energy in a battery in the event of an internal fault.

It is further an object of the present invention to provide a means of notifying a user or operator that a battery fault has occurred.

DETAILED DESCRIPTION OF THE INVENTION AND ITS PREFERRED EMBODIMENTS

Figure 1:
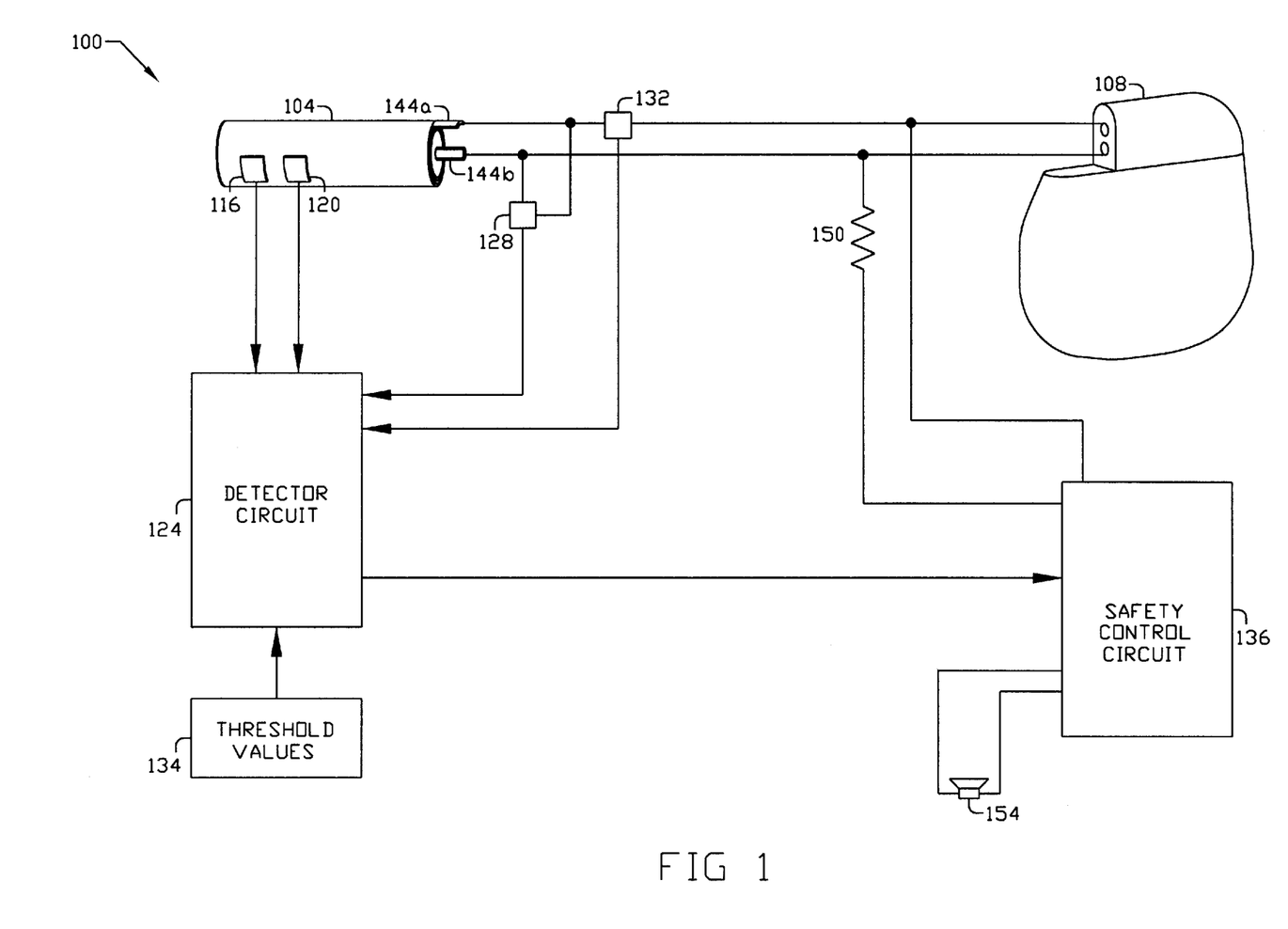
FIG. 1 is a schematic diagram illustrating the best mode of the present invention.

Referring to the drawings, FIG. 1 is a schematic diagram illustrating the best mode of the claimed safety circuit 100 having a battery 104 powering an external device 108 (such as a spinal cord stimulator ). Sensors 116 and 120 detect temperature and pressure respectively, and are connected to a detector circuit 124 which also measures voltage 128 across and current 132 traveling through the battery 104. Predetermined threshold values 134 are stored in the memory of the detector circuit 124 and, in the event of an internal fault in the battery (e.g., over-heating of excessive pressure in, or high current flow through the battery), the detector circuit 124 signals the safety control circuit 136 to initiate an emergency energy discharge sequence including connection of the terminals 144a and 144b of the battery 104 to an energy discharge device 150. Simultaneously, the safety control circuit 136 initiates an alert signal device 154 to alert the operator or user that a failure has taken place. The safety control circuit 136 may control the rate of discharge of energy from the battery 104 by pulsing (alternatingly connecting and disconnecting) the battery 104 from the discharge device 150.

Figure 2:
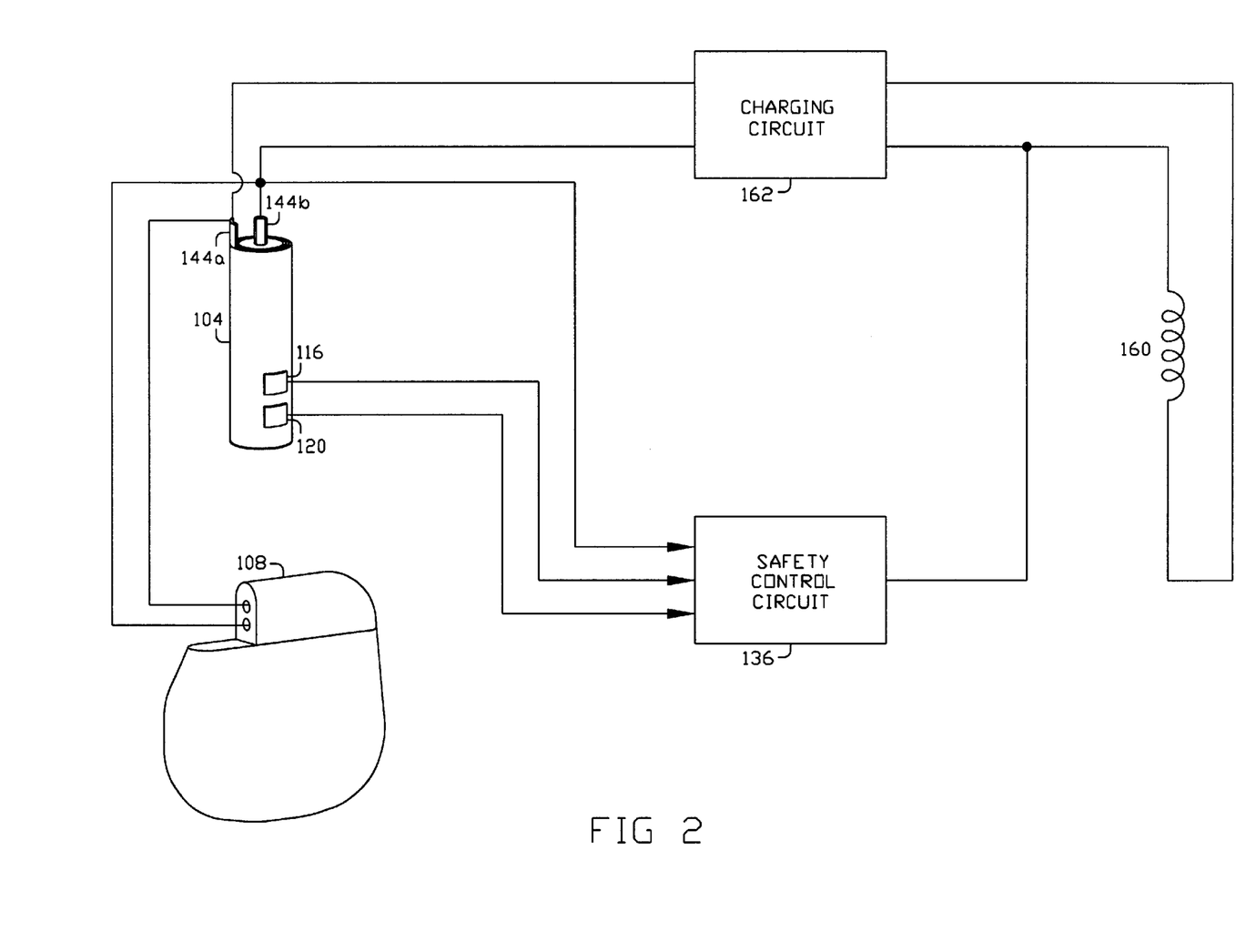
FIG. 2 is a schematic diagram of a battery incorporating an energy discharge circuit utilizing the secondary inductive charging coil in an implantable device as an energy discharge (dump) device.

FIG. 2 illustrates one implementation of the present invention in which the secondary inductive charging coil 160 (which normally functions to charge the battery 104 through a charging circuit 162) is used as the energy discharge device. In this example, when a faulty battery condition is detected by a thermocouple 116 or pressure switch 120, (indicating the existence of an internal short circuit or over-pressure), the safety control circuit 136 connects the inductive charging coil 160, across the terminals 144a and 144b of the failed battery causing it to dissipate energy from the battery 104 in the form of heat, thus preventing the battery 104 itself from heating to dangerous levels. Components other than or in addition to inductive charging coils may interchangeably be used as an emergency energy discharge device. For example, alerting devices such as sound generators (e.g., piezoelectric devices, horns, bells, etc.), vibrators, or lights may be used as part of the emergency discharge circuit, as well as other signaling devices known in the art.

Figure 3:
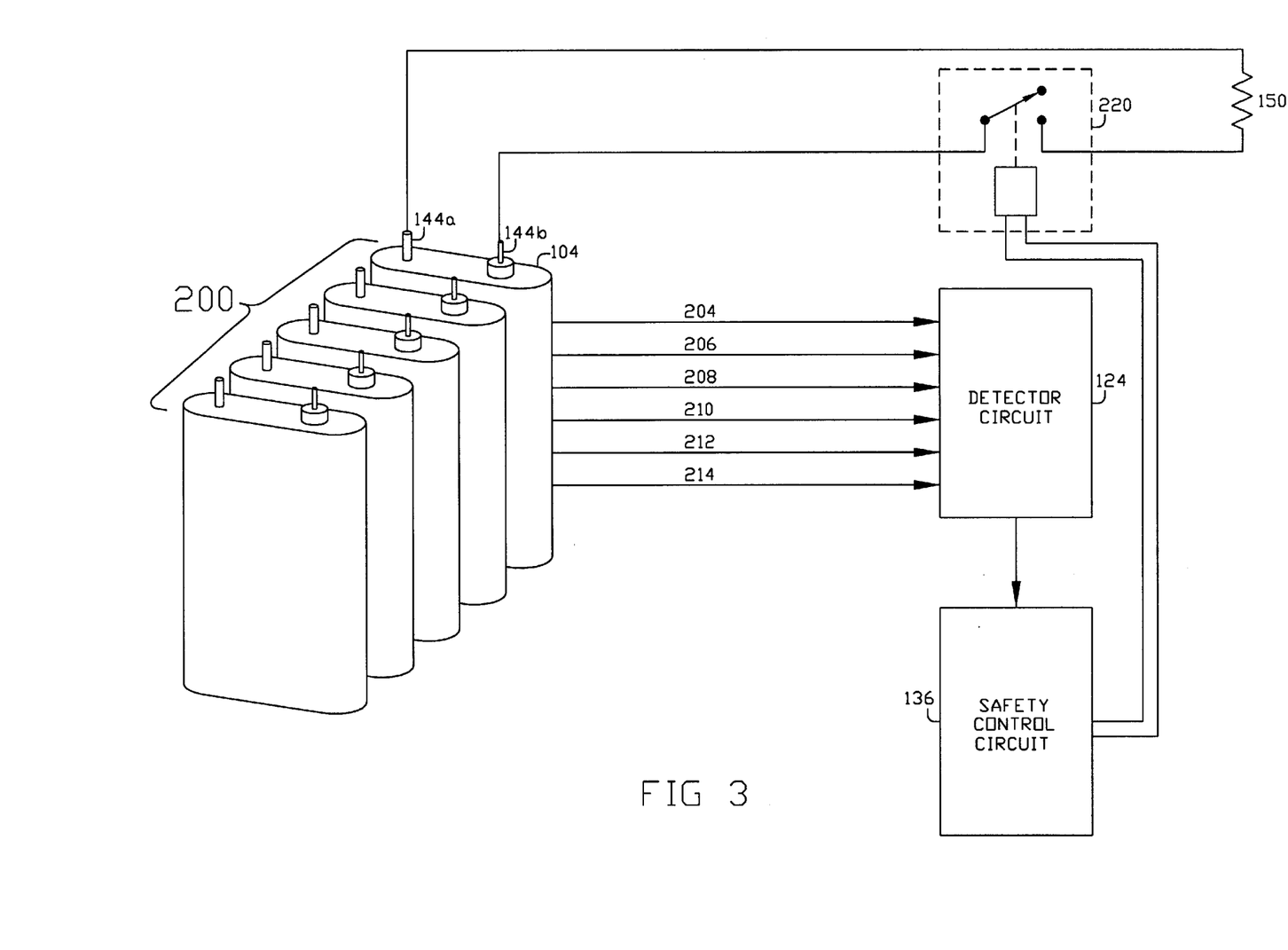
FIG. 3 is an illustration of the present invention implemented in a large battery array such as a submarine power source.

FIG. 3 illustrates the method of the present invention in a battery array 200 such as that used to power submarines and electric vehicles, and in power grid load leveling installations. Here, a detector circuit 124 monitors battery conditions including temperature 204, pressure 206, voltage 208, current 210, electrolyte specific gravity 212 and electrolyte level 214. These values are communicated to the safety control circuit 136 which is programmed to initiate an emergency discharge sequence in the event of a fault condition in a battery (internal short circuit or over-pressure). Specifically, if predetermined parameters, or combinations thereof, stored in the memory of the safety control circuit 136, are exceeded, the faulty battery 104 is isolated from the battery array 200 by bypassing the faulty battery 104 in the array circuit. Simultaneously or immediately thereafter, the safety control circuit 136 signals a relay 220 to connect the terminals 144a and 144b of the faulty battery 104 across an energy discharge load 150 such as a resistance heater. The safety control circuit 136 may be programmed to vary the drain rate by pulsing (connecting and disconnecting) the discharge or by varying the drain rate by adjusting the resistance of the load (variable resistor). The detector circuit 124 and safety control circuit 136 may be combined or integrated. Typically, they will comprise digital circuits, but may take the form of relatively simple electro-mechanical devices such as bimetal thermal switches or deformable pressure switches, both well known in the art. In such a case, over-temperature or excessive pressure would cause immediate direct connection of the terminals 144a and 144b across the energy discharge device 500.

Figure 4:
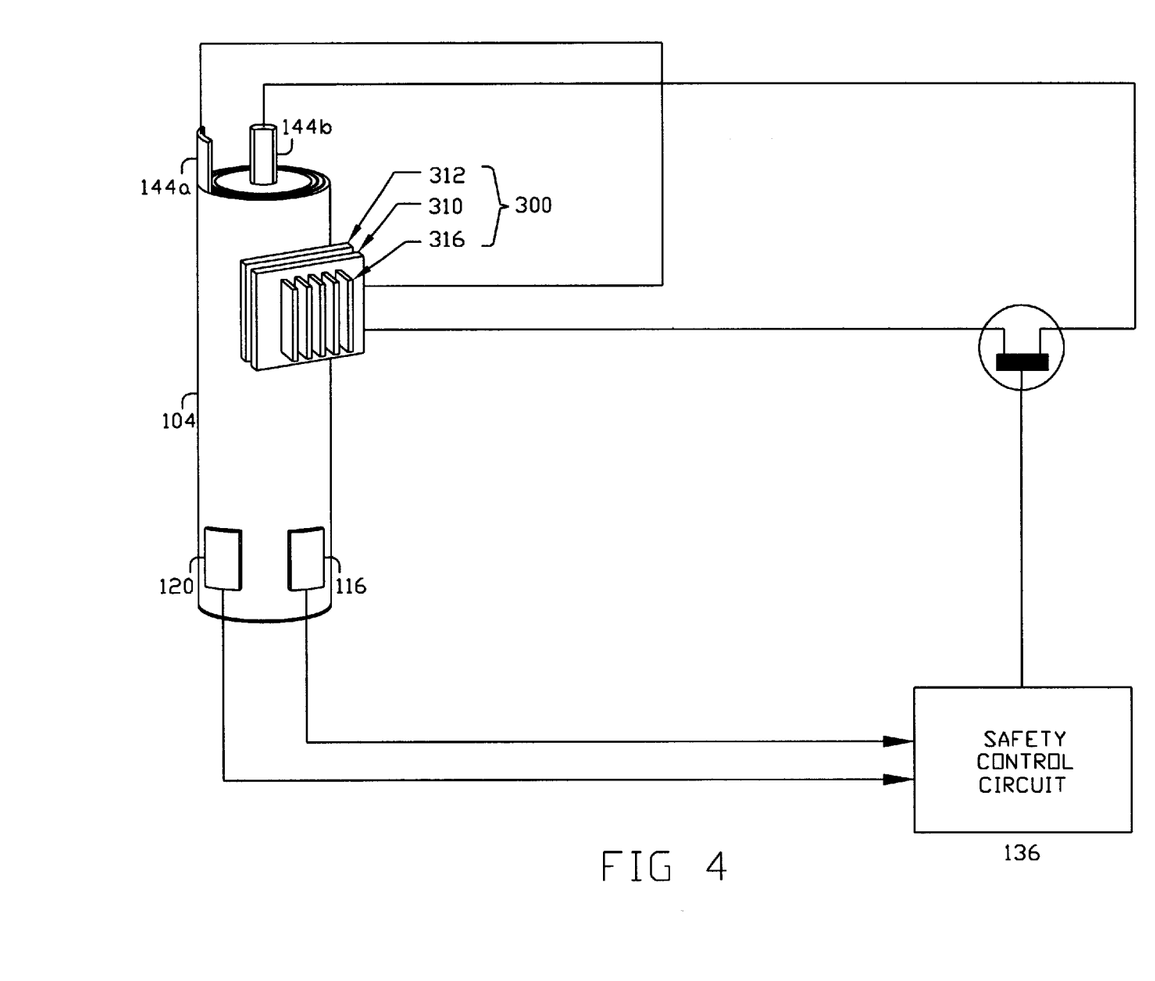
FIG. 4 illustrates the use of a Peltier device (sometimes referred to as a thermoelectric cooler) as an energy drain device.

FIG. 4 illustrates the use of a Peltier device 300 used as an energy discharge device. In the event of an internal short circuit in the battery 104, as detected by a thermocouple 116 or pressure transducer 120, the safety control circuit 136 connects the battery terminals 144 across the terminals of the Peltier device 300 causing one side 310 to heat-up and the other side 312 to cool down. By placing the cooled side 312 in thermal contact with the battery 104 and the heated side in thermal contact with a heat sink 316, the draining of excess heat from the battery may be accelerated using the remaining stored electrical energy in the battery, which drives the Peltier device 300 "heat pump."

Figure 5:
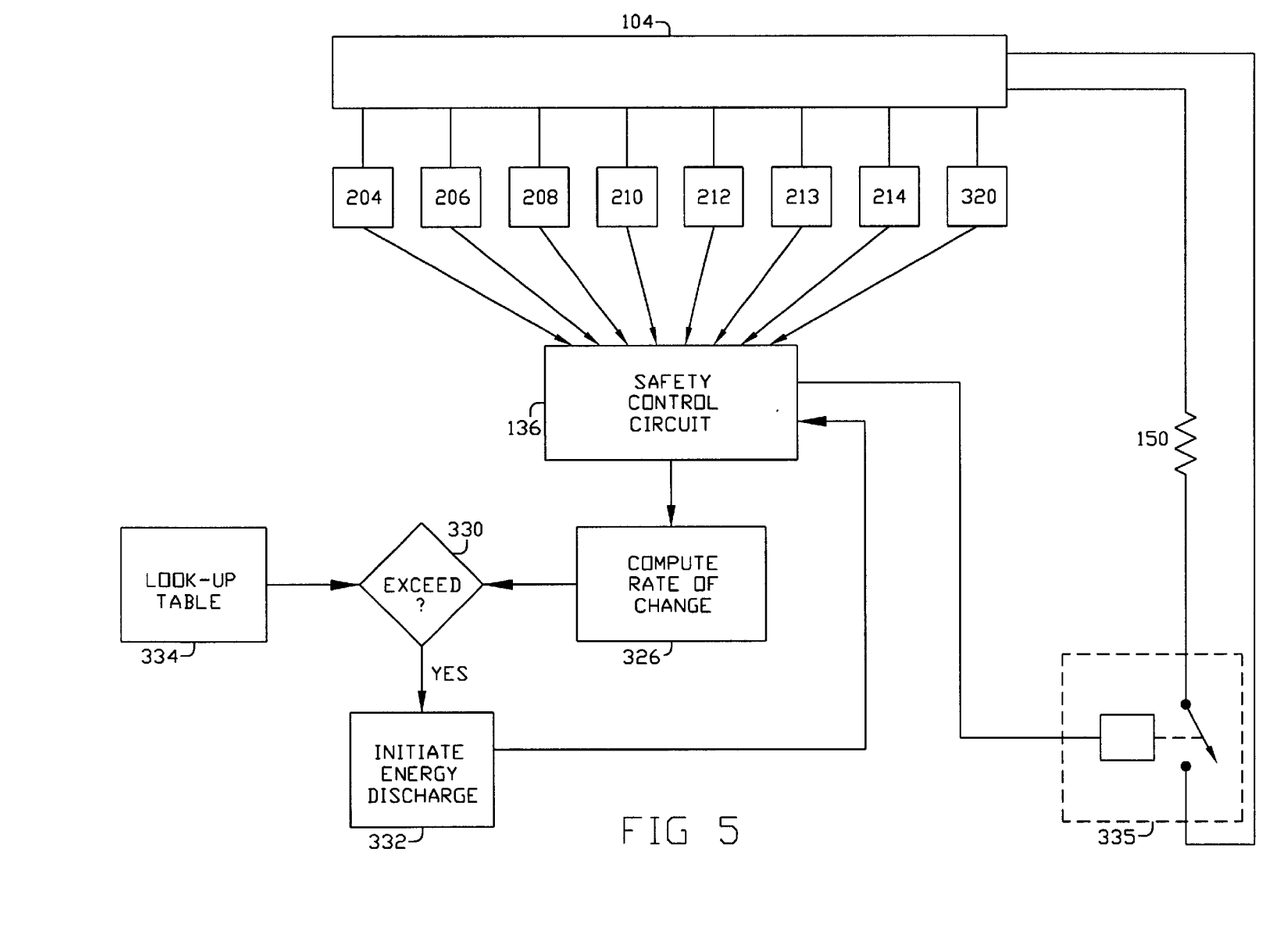
FIG. 5 is a logic flow and schematic diagram showing implementation of the best mode of the present invention.

FIG. 5 is a combined logic flow/schematic diagram illustrating the implementation of the present invention wherein a combination of battery parameters are monitored and applied to an algorithm to decide whether to initiate an emergency energy discharge sequence and, if so, control the rate. The greater the remaining charge in the battery, the more urgent is the need to drain remaining energy quickly. Therefore, the following algorithm may advantageously be used to control the rate of emergency energy discharge:

If $V_1 > V_2$ and Internal Short Detected, then Initiate Fast Discharge Mode;

If $V_1 \leq V_2$ and Internal Short Detected, then Initiate Slow Discharge Mode Where $V_1$=battery voltage at time of fault
$V_2$=predetermined threshold voltage.

$V_2$ would be set in terms of remaining energy. Normally $V_2$ would be a voltage resulting from a remaining state of charge of approximately 70%, but can range from 50% to 95%. Additionally, multiple thresholds may be set to initiate a range of emergency energy discharge rates. Depending on the application, additional variations of this algorithm will be necessary. In some cases, the inverse may be required. For example, a battery with a greater charge but a moderate internal short (moderately-rising temperature or pressure) may initiate a slower emergency energy discharge rate than a battery with a lower remaining charge but a severe internal short (rapidly rising temperature or pressure).

In the example illustrated in FIG. 5, the safety control circuit 136 monitors voltage 208 of the battery 104 current 210 passing through the battery 104, internal battery impedance 320, battery temperature 204, internal battery pressure 206 and state of charge 212. Other well-known direct and indirect measures of the operating state of the battery may similarly be used such as measuring the amount of bulging of the battery enclosure. It then computes rates of change of each of the factors 326 and compares 330 them to a look-up table of acceptable or threshold values 334 stored in memory. The safety control circuit 136 then initiates an emergency energy discharge sequence if one or a combination of parameters in the values stored in the look-up table 334 are exceeded by the measured values. If an emergency energy discharge sequence is initiated, the safety control circuit 136 causes relay 335 to close the circuit connecting the battery 104 directly to the discharge device 150. The safety control circuit 136 can vary the rate of drain from the battery to maintain safe temperatures of the battery and the energy drain device. For example, the rate of drain of the battery may be a function of the remaining energy in the battery and the rate of increase in temperature 204 and/or pressure 206 of the battery. The rate of drain may be a function of one or of a combination of the following factors: voltage 208, change in voltage, rate of change in voltage, state of charge, temperature 204, change in temperature, rate of change in temperature, impedance 320, change in impedance, rate of change in impedance, pressure 206, change in pressure, rate of change in pressure, electrolyte pH 213, and/or electrolyte specific gravity 214. Such rate of emergency energy discharge may be linear, non-linear, continuous or intermittent. State of charge is typically determined as a function of a battery's open circuit voltage, usually integrated over a period of time. However, state of charge may also be measured by such means as specific gravity of electrolyte and other methods well-known in the art.

Figure 6:
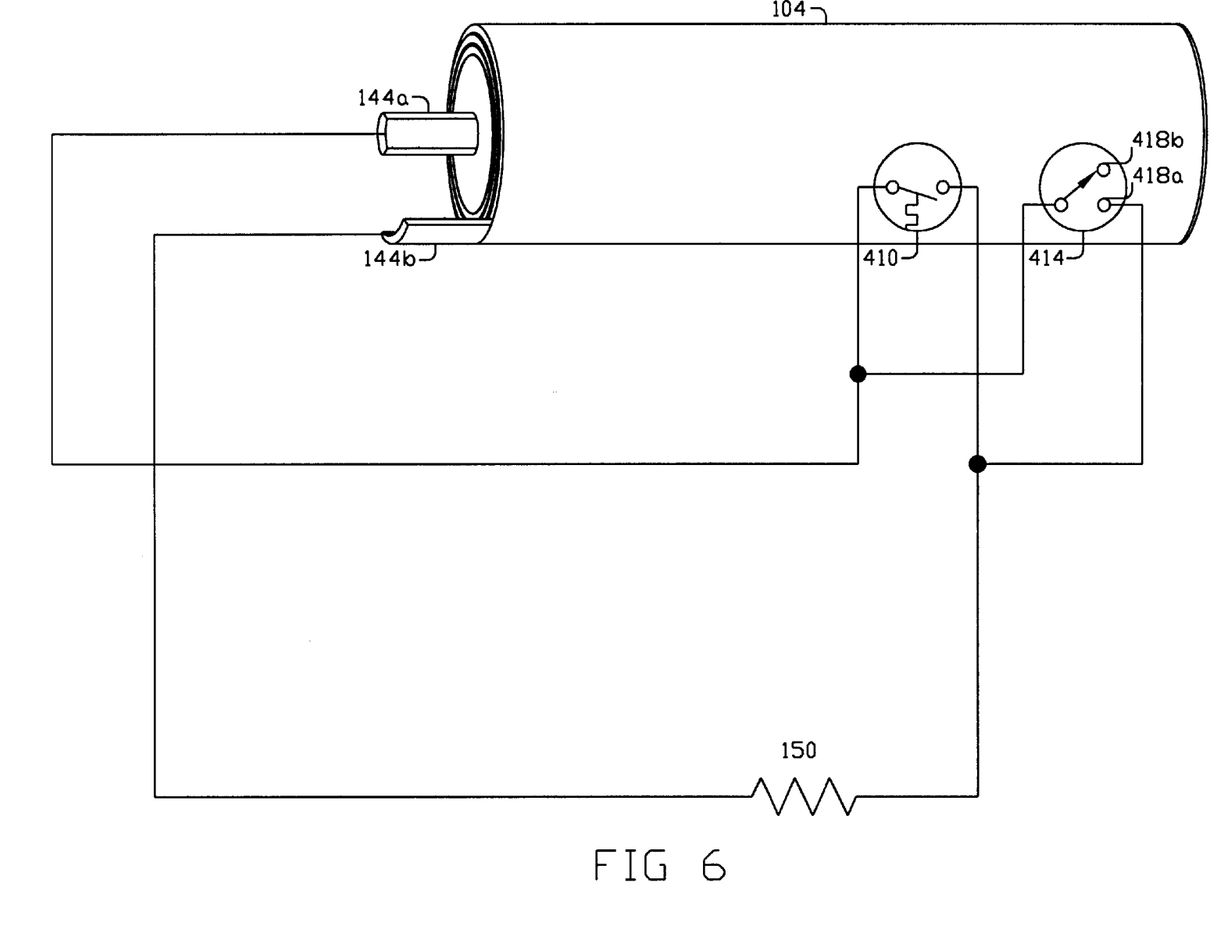
FIG. 6 is a schematic diagram of the present invention using a simple bimetal temperature-sensing switch and a mechanical pressure-sensing switch as the triggering devices to initiate an emergency energy discharge.

FIG. 6 illustrates the simplest form of implementing the present invention as an automated device. Here, when a simple electro-mechanical device such as a bimetal switch reaches a threshold temperature, it connects the terminals 144a and 144b of the battery 144 to a discharge device 150. Similarly, a pressure-activated switch 414 could initiate the drain of energy from the battery by simply being activated by pressure built-up in the battery, pushing contacts 418a and 418b closed causing connection of the terminals of the battery 144 to the energy discharge load 150.

Figure 7:
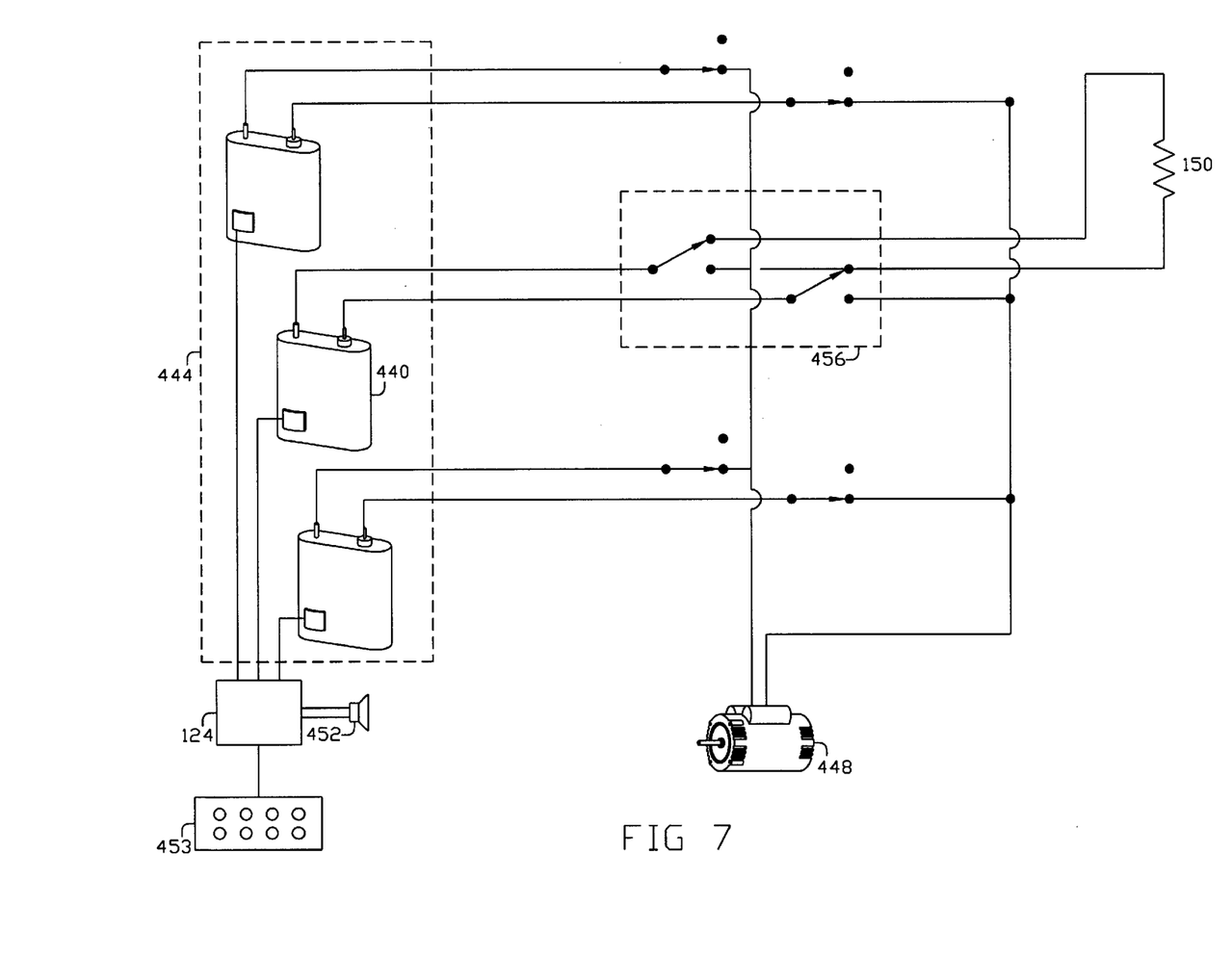
FIG. 7 is a schematic diagram of the present invention implemented as a manually-operated system on a submarine.

As illustrated by FIG. 7, although this invention is best implemented as an automated system, it can also be manually operated where appropriate. In this example, if an internal fault such as overheating is detected by a sensor 116 and a detector circuit 124 in a faulty battery 440 in a large battery array 444 such as powering a submarine drive motor 448, the operator may, upon receiving a signal from an alarm 452 or a display 453, manually isolate the faulty battery 440 using an isolation switch 456, then connect it to an emergency energy discharge load 150. Additionally, discharge loads can take the form of any device that converts energy stored in a battery to another form of energy. For example, the stored energy could be converted into heat (e.g., resistance heater), electromagnetic (e.g., light bulb), kinetic (e.g., flywheel), chemical (e.g., charge another battery) or potential energy (e.g., wind a spring). Obvious to one skilled in the art should be that this implementation of the present invention would be applicable in a wide range of installations, including, but not limited to, power grid load-leveling installations, photovoltaic storage banks, and the like.

Figure 8:
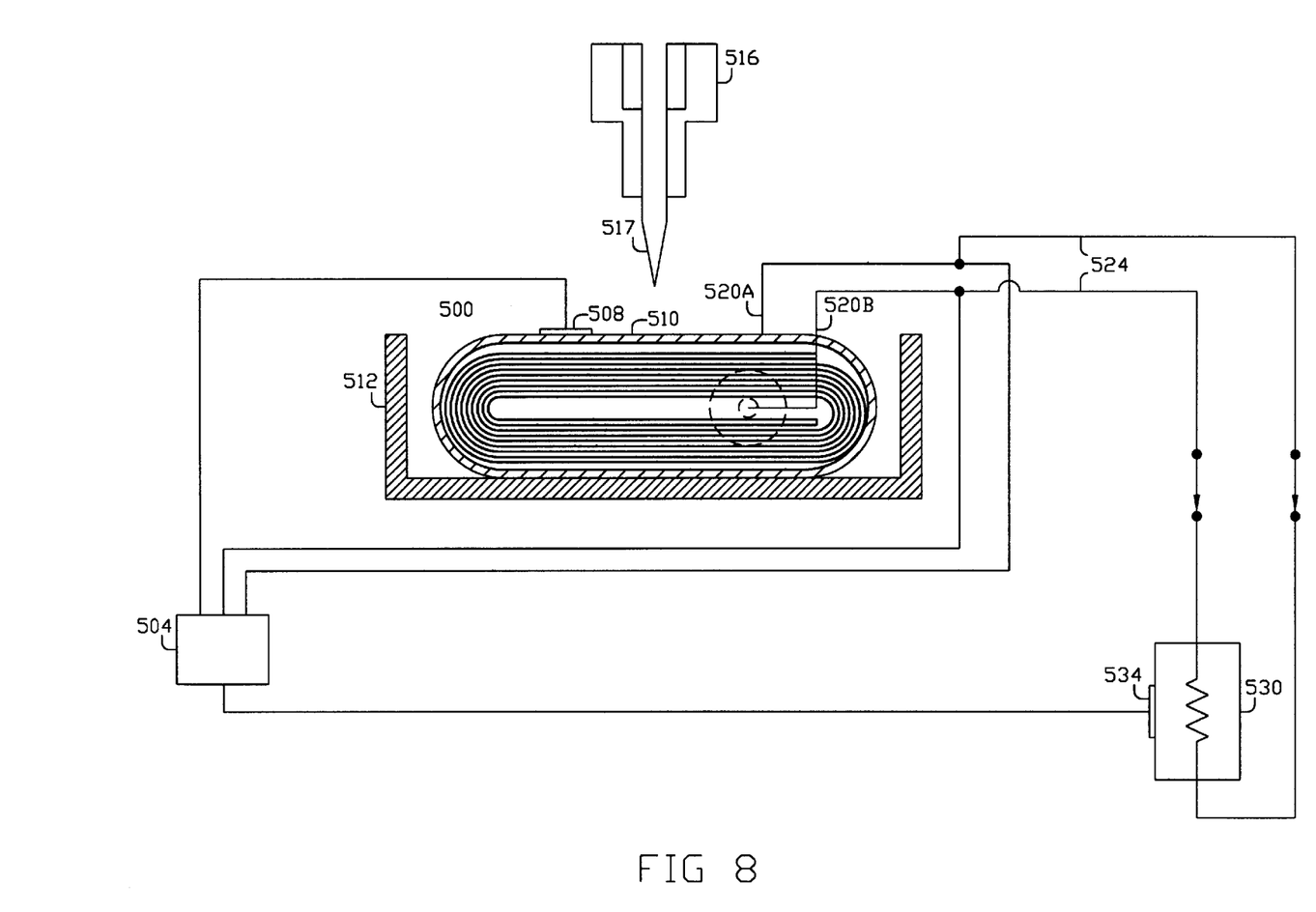
FIG. 8 is a schematic diagram illustrating the method used for testing the present invention in actual batteries.

FIG. 8 is a schematic diagram of the set-up that was used to test the present invention. In tests, a fully-charged 320 mAh lithium ion cell 500 with liquid electrolyte was connected to a Yokogawa MobileCorder MV100 recording voltmeter 504. A type K thermocouple 508 was attached to the battery case 510 and connected to the recording voltmeter which was calibrated to record temperature measured by the thermocouple. The battery was placed in a jig 512 designed to minimize conductive heat loss, limiting heat dissipation to convective loss. A remotely operated pneumatic ram 516 quickly drove a nail through the battery.

In addition, the terminals 520a and 520b of the battery 500 were connected to wires 524 leading to a resistor 530. A second thermocouple 534 was bonded to the resistor. The test protocol was to activate the ram 516, penetrating the battery 500 with a nail 517, then, one second later, close the circuit across the battery terminals 520a and 520b through the resistor 530.

Figure 9:
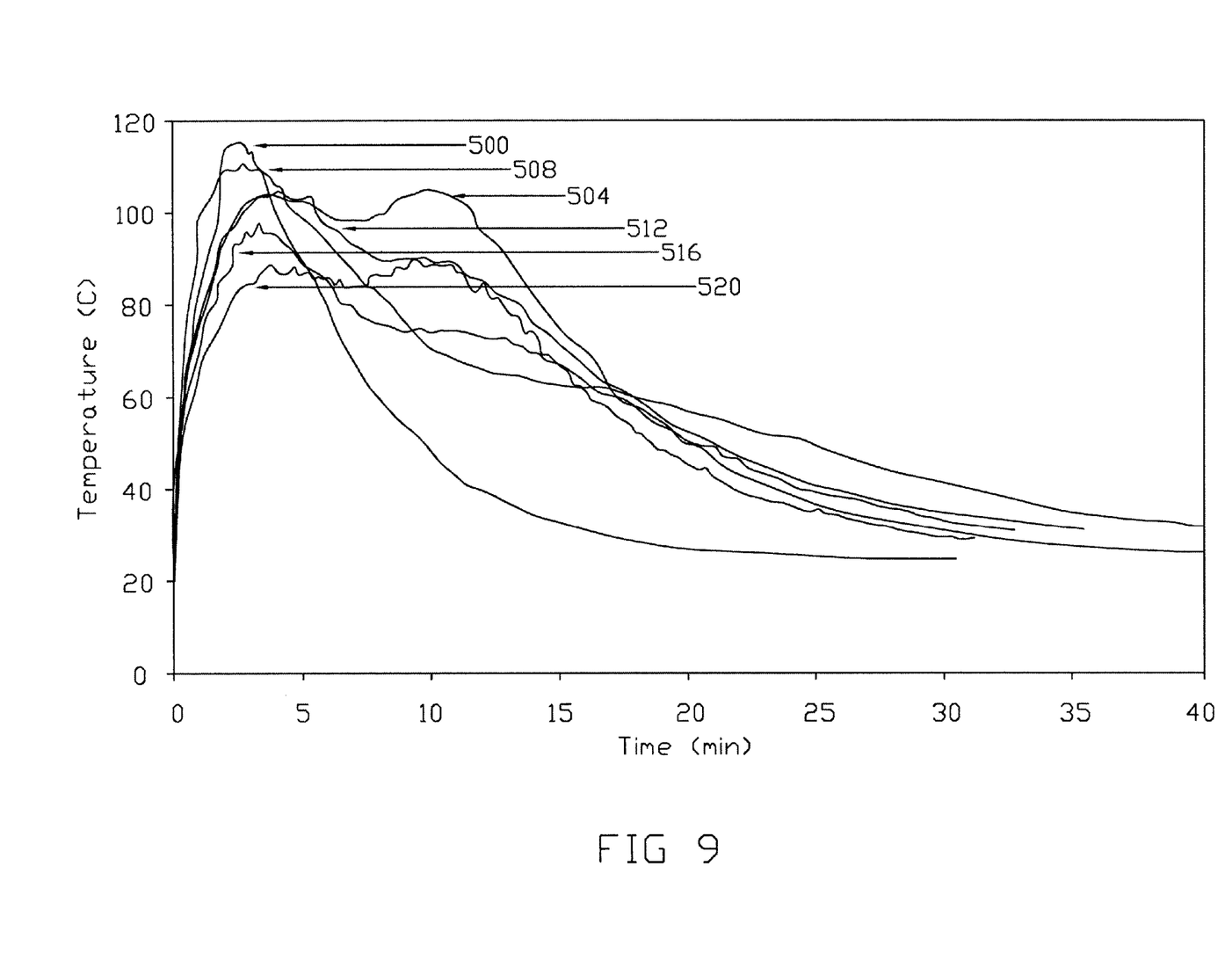
FIG. 9 is a time vs. temperature graph showing the results of controlled testing of the present invention during a nail penetration test.

FIG. 9 discloses the results of testing of the present invention. Trace 600 reflects the battery temperature for a pure nail penetration (no external energy discharge circuit). Its temperature peaked at approximately 118° C. (244° F.) in approximately 3 minutes, then gradually dropped to ambient temperature over approximately 25 minutes.

Trace 604 illustrates a similar test showing a "pure external short." That is, the terminals 520 were connected with a near zero ohm resistance wire, and no nail penetration was initiated. In this case, the battery temperature rose to 105° C. (221° F.) in approximately 4 minutes, and remained at or above 100° C. (212° F.) for almost 10 minutes. This cell did not reach ambient temperature for over 35 minutes.

Trace 608 reflects the result of a nail penetration test with a 10 ohm resistor connected across the terminals of the battery one second after the cell was penetrated by a nail. In this case, the battery case temperature rose to 115° C. (239° F.) in 4 minutes, then gradually dropped to ambient temperature in over 35 minutes.

Trace 612 reflects the results of a nail penetration test with a 1 ohm resistor connected across the terminals of the battery one second after the cell was penetrated by a nail. In this case, the battery case temperature rose to 112° C. (234° F.) in 4.5 minutes, then gradually dropped to ambient temperature in approximately 30 minutes.

Trace 616 reflects the results of a nail penetration test with a 0.47 ohm resistor connected across the terminals of the battery one second after the cell was penetrated by a nail. In this case, the battery case temperature rose to 99° C. (212° F.) in 3 minutes, then gradually dropped to ambient temperature in approximately 30 minutes.

Trace 620 reflects the results of a nail penetration test with a 0.008 ohm wire connected across the terminals of the battery one second after the cell was penetrated by a nail. In this case, the battery case temperature rose to 85° C. (185° F.) in 4 minutes, stayed relatively level below 90° C. (194° F.) for approximately 10 minutes, then rapidly dropped to ambient temperature in approximately 30 minutes.

There is a significant difference between the cell in trace 620 and that with no emergency energy drain in case 600, namely a peak temperature of 118° C. (244° F.) versus 90° C. (194° F.).

From these test data, it will be clear to those experienced in the art that, after an internal short is detected, quickly draining remaining energy from the battery by deliberately connecting the external terminals across an electrically resistive circuit presents a significant benefit versus merely allowing the battery to reach its peak temperature as current flows between anode and cathode inside the battery through a small internal pathway. These data indicate that, in the event of an internal short, a low (or near zero) resistance external short implemented quickly can prevent overheating leading to catastrophic failure of the battery enclosure. Initiating the emergency energy discharge more quickly after nail penetration would further reduce the peak battery temperature.

It should be apparent to the reader that many variations of the present invention are possible without departure from the scope of the present invention. The specific implementations disclosed above are by way of example and for the purposes of enabling persons skilled in the art to implement the invention only. Accordingly, the invention is not to be limited except by the appended claims and legal equivalents.

We claim:

1. A method for rapidly discharging stored energy from an energy storage device comprising:

providing at least one said energy storage device, monitoring operating states of said energy storage device, setting safety threshold parameters for said operating states, comparing said operating states to said safety threshold parameters, determining whether one or more said operating states exceeds at least one said safety threshold parameter, responsive to said determining that said one or more operating states exceeds at least one said safety threshold parameter, initiating an emergency discharge of energy stored in said energy storage device to safely discharge stored energy.

2. The method claimed in claim 1 therein said energy storage device is a battery.

3. The method as claimed in claim 1 where said operating states includes at least one of the following:

voltage, change in voltage, rate of change in voltage, current, change in current, rate of change in current, state of charge, change in state of charge, rate of change in state of charge, temperature, change in temperature, rate of change in temperature, impedance, change in impedance, rate of change in impedance, pressure, change in pressure, rate of change in pressure, electrolyte pH, electrolyte specific gravity, amount of bulging of battery enclosure, change in bulging of battery enclosure, and rate of change of bulging of battery enclosure.

4. The method as claimed in claim 1 wherein said emergency discharge of said stored energy is accomplished by converting said stored energy from one form of energy into another form of energy.

5. The method of claim 4 wherein said discharge of energy is accomplished by converting said stored energy from electrical to one or more of the following energy forms: heat, electromagnetic radiation, kinetic or potential, chemical.

6. The method claimed in claim 1 wherein said determining whether one or more said operating states exceeds said safety threshold condition parameter is carried out according to an algorithm.

7. The method as claimed in claim 6 wherein said algorithm includes one or more of the following logical steps:

If $P_1 \geq T_1$ then initiate emergency energy dump
   Where $P_1$ is a said operating parameter, and
   $T_1$ is a said safety threshold.

8. The method as claimed in claim 7 wherein $P_1$ and $T_1$ are parameters including at least one of the following:
   voltage,
   change in voltage,
   rate of change in voltage,
   current,
   change in current,
   rate of change in current,
   state of charge,
   change in state of charge,
   rate of change in state of charge,
   temperature,
   change in temperature,
   rate of change in temperature,
   impedance,
   change in impedance,
   rate of change in impedance,
   pressure,
   change in pressure,
   rate of change in pressure,
   electrolyte pH,
   electrolyte specific gravity,
   amount of bulging of battery enclosure,
   change in bulging of battery enclosure,
   and rate of change of bulging of battery enclosure.

9. The method of claim 6 wherein said algorithm includes one or more of the following logical steps:

If $P_1 \leq T_1$ then initiate emergency energy dump
   Where $P_1$ is a said operating parameter, and
   $T_1$ is a said safety threshold.

10. The method as claimed in claim 9 wherein $P_1$ and $T_1$ are parameters including at least one of the following:
   voltage,
   change in voltage,
   rate of change in voltage,
   current,
   change in current,
   rate of change in current,
   state of charge,
   change in state of charge,
   rate of change in state of charge,
   temperature,
   change in temperature,
   rate of change in temperature,
   impedance,
   change in impedance,
   rate of change in impedance,
   pressure,
   change in pressure,
   rate of change in pressure,
   electrolyte pH,
   electrolyte specific gravity,
   amount of bulging of battery enclosure,
   change in amount of bulging of battery enclosure,
   and rate of change of amount of bulging of battery enclosure.

11. The method as claimed in claim 1 wherein the rate of discharge of energy from said energy storage device is controlled by a predetermined algorithm.

12. The method of claim 11 wherein said predetermined algorithm includes at least on of the following parameters:
   voltage,
   change in voltage,
   rate of change in voltage,
   current,
   change in current,
   rate of change in current,
   state of charge,
   change in state of charge,
   rate of change in state of charge,
   temperature,
   change in temperature,
   rate of change in temperature,
   impedance,
   change in impedance,
   rate of change in impedance,
   pressure,
   change in pressure,
   rate of change in pressure,
   electrolyte pH,
   electrolyte specific gravity,
   amount of bulging of battery enclosure,
   change in amount of bulging of battery enclosure,
   and rate of change of amount of bulging of battery enclosure.

13. The method of claim 11 wherein said rate of discharge of energy is directly proportional to the quantity of energy remaining in said storage device.

14. The method of claim 11 wherein said rate of discharge of energy is inversely proportional to the quantity of energy remaining in said storage device.

15. The method claimed in claim 1 further including the step of initiating a notification signal when said one or more said operating states exceeds said safety threshold condition parameters.

16. An emergency energy discharge system comprising:
   at least one energy storage device,
   at least one detecting device for monitoring one or more operating parameters of said energy storage device,
   means for storing predetermined safety threshold values for operating parameters of said energy storage device,
   comparison means for comparing said predetermined safety threshold values with said operating parameters,
   decision means for determining whether said operating parameters exceed one or more said predetermined operating threshold values,
   activation means responsive to decision means,
   energy discharge device for discharging said energy stored in said energy storage device so as to render said energy storage device safe before the fault or faults causing the said monitored operating parameters to exceed said safety threshold values renders the energy storage device unsafe, and at such a rate as to not itself become a safety hazard.

17. The emergency energy discharge system claimed in claim 16 wherein said decision means comprises a human operator.

18. The emergency energy discharge system as claimed in claim 16 wherein said decision means comprises a mechanical device.

19. The emergency energy discharge system as claimed in claim 18 wherein said mechanical device comprises a thermal switch.

20. The emergency energy discharge system as claimed in claim 18 wherein said mechanical device comprises a pressure switch.

21. The emergency energy discharge system as claimed in claim 16 wherein said decision means comprises:
   an electronic circuit further comprising,
      an electronic data storage device,
      an electronic computing device,
      a decision algorithm stored in said electronic data storage device,
      an output signal generating device responsive to said decision algorithm.

22. The emergency energy discharge system as claimed in claim 21 wherein said electronic data storage device comprises an integrated circuit.

23. The emergency energy discharge system claimed in claim 21 wherein said electronic computing device comprises an integrated circuit.

24. The emergency energy discharge system claimed in claim 21 wherein said decision algorithm comprises the following steps:
   if $C_1 \geq T_1$ then initiate emergency energy discharge,
      where if $C_1$ is an operating condition, and
      $T_1$ is a triggering safety threshold.

25. The emergency energy discharge system claimed in claim 24 wherein said variables $C_1$ and $T_1$ represent at least one of the following:
   voltage,
   change in voltage,
   rate of change in voltage,
   current,
   change in current,
   rate of change in current,
   state of charge,
   change in state of charge,
   rate of change in state of charge,
   temperature,
   change in temperature,
   rate of change in temperature,
   impedance,
   change in impedance,
   rate of change in impedance,
   pressure,
   change in pressure,
   rate of change in pressure,
   electrolyte pH,
   electrolyte specific gravity,
   amount of bulging of battery enclosure,
   change in amount of bulging of battery enclosure,
   and rate of change of amount of bulging of battery enclosure.

26. The emergency energy discharge system claimed in claim 21 wherein said decision algorithm comprises the following steps:
   if $C_1 \leq T_1$ then initiate emergency energy discharge,
      where if $C_1$ is an operating condition, and
      $T_1$ is a triggering safety threshold.

27. The emergency energy discharge system claimed in claim 26 wherein said variables $C_1$ and $T_1$ represent at least one of the following:
   voltage,
   change in voltage,
   rate of change in voltage,
   current,
   change in current,
   rate of change in current,
   state of charge,
   change in state of charge,
   rate of change in state of charge,
   temperature,
   change in temperature,
   rate of change in temperature,
   impedance,
   change in impedance,
   rate of change in impedance,
   pressure,
   change in pressure,
   rate of change in pressure,
   electrolyte pH,
   electrolyte specific gravity,
   amount of bulging of battery enclosure,
   change in amount of bulging of battery enclosure,
   and rate of change of amount of bulging of battery enclosure.

28. The emergency energy discharge system claimed in claim 16 further including a signaling device to produce an alerting signal when said emergency energy discharge is activated.

29. The emergency energy discharge system claimed in claim 16 further comprising a means for controlling the rate of said energy discharge.

30. The emergency energy discharge system claimed in claim 29 wherein said controlled rate of said energy discharge is proportional to energy remaining in said battery.

31. The emergency energy discharge system claimed in claim 29 wherein said controlled rate of said energy discharge is inversely proportional to energy remaining in said battery.

32. The emergency energy discharge system claimed in claim 29 wherein said controlled rate of said energy discharge is a function of one or more of the following battery parameters:
   voltage,
   change in voltage,
   rate of change in voltage,
   current,
   change in current,
   rate of change in current,
   state of charge,
   change in state of charge, rate of change in state of charge,
temperature,
change in temperature,
rate of change in temperature,
impedance,
change in impedance,
rate of change in impedance,
pressure,
change in pressure,
rate of change in pressure,
electrolyte pH,
electrolyte specific gravity,
amount of bulging of battery enclosure,
change in amount of bulging of battery enclosure,
and rate of change of amount of bulging of battery enclosure.

33. The emergency energy discharge system claimed in claim 29 wherein said rate of said energy discharge is controlled by varying the resistance of said energy discharge means.

34. The emergency energy discharge system claimed in claim 29 wherein said rate of said energy discharge is controlled by pulsing said energy discharge.

35. An emergency electrical energy discharge circuit comprising:
   at least one electrical storage device,
   at least one sensor for monitoring one or more operating parameters of said electrical storage device,
   a device for communicating said parameters monitored by said sensor,
   memory storage containing predetermined safety thresholds for operating parameters of said electrical storage device,
   comparison circuit for comparing said predetermined safety thresholds with said operating parameters,
   decision means for determining whether said operating parameters exceed one or more said predetermined operating thresholds stored in said memory storage,
   one or more switches responsive to said decision means,
   one or more energy discharge devices for discharging said energy stored in said electrical storage device at a rate rapid enough to render said electrical energy storage device safe before the fault or faults causing the said monitored operating parameters to exceed said safety thresholds renders the electrical energy storage device unsafe, and at such a rate as to not itself become a safety hazard.

36. The emergency energy discharge circuit claimed in claim 35 wherein said energy storage device is a battery.

37. The emergency energy discharge circuit claimed in claim 35 wherein said decision means is a human operator.

38. The emergency energy discharge circuit as claimed in claim 35 wherein said decision means is a mechanical device.

39. The emergency energy discharge circuit as claimed in claim 35 wherein said mechanical device is a temperature-activated switch.

40. The emergency energy discharge circuit as claimed in claim 35 wherein said mechanical device is a pressure-activated switch.

41. The emergency energy discharge circuit as claimed in claim 35 wherein said operating parameters includes at least one of the following:
voltage,
change in voltage,
rate of change in voltage,
current,
change in current,
rate of change in current,
state of charge,
change in state of charge,
rate of change in state of charge,
temperature,
change in temperature,
rate of change in temperature,
impedance,
change in impedance,
rate of change in impedance,
pressure,
change in pressure,
rate of change in pressure,
electrolyte pH,
electrolyte specific gravity,
amount of bulging of battery enclosure,
change in amount of bulging of battery enclosure,
and rate of change of amount of bulging of battery enclosure.

42. The emergency energy discharge circuit as claimed in claim 35 wherein said decision means comprises,
   an electronic circuit further comprising,
      data memory storage,
      a computing device,
      a decision algorithm stored in said data memory storage,
      an output signal generating device responsive to said decision algorithm.

43. The emergency electrical energy discharge circuit as claimed in claim 42 wherein said data memory storage includes an integrated circuit.

44. The emergency electrical energy discharge circuit claimed in claim 42 wherein said computing device comprises at least one integrated circuit.

45. The emergency electrical energy discharge circuit claimed in claim 35 further including a signaling device to produce an alerting signal when said emergency energy discharge is activated.

46. The emergency electrical energy discharge circuit claimed in claim 35 for use in the event of penetration of said electrical storage device by an electrically-conducting object.

47. The emergency energy discharge circuit claimed in claim 35 further comprising a means for controlling the rate of said energy discharge.

48. The emergency energy discharge circuit claimed in claim 47 wherein said controlled rate of said energy discharge is proportional to energy remaining in said battery.

49. The emergency energy discharge circuit claimed in claim 47 wherein said controlled rate of said energy discharge is inversely proportional to energy remaining in said battery.

50. The emergency energy discharge circuit claimed in claim 47 wherein said controlled rate of said energy discharge is a function of one or more of the following battery parameters:
voltage,
change in voltage, rate of change in voltage,
current,
change in current,
rate of change in current,
state of charge,
change in state of charge,
rate of change in state of charge,
temperature,
change in temperature,
rate of change in temperature,
impedance,
change in impedance,
rate of change in impedance,
pressure,
change in pressure,
rate of change in pressure,
electrolyte pH,
electrolyte specific gravity,
amount of bulging of battery enclosure,
change in amount of bulging of battery enclosure,
and rate of change of amount of bulging of battery enclosure.

51. A battery safety circuit comprising:
one or more first electrochemical cells;
at least one sensor monitoring at least one of the following conditions of said one or more first electrochemical cells:
  voltage,
  change in voltage,
  rate of change in voltage,
  current,
  change in current,
  rate of change in current,
  state of charge,
  change in state of charge,
  rate of change in state of charge,
  temperature,
  change in temperature,
  rate of change in temperature,
  impedance,
  change in impedance,
  rate of change in impedance,
  pressure,
  change in pressure,
  rate of change in pressure,
  electrolyte pH,
  electrolyte specific gravity,
  amount of bulging of battery enclosure,
  change in amount of bulging of battery enclosure, and
  rate of change of amount of bulging of battery enclosure;
memory storage;
predetermined safety thresholds for said at least one condition;
a comparator circuit;
a control circuit;
a diverter switch device;
an energy discharge load;
said comparator circuit comparing said monitored conditions with said stored predetermined safety thresholds and signaling said control circuit whenever said at least one monitored condition exceeds one or more said predetermined thresholds;

said control circuit sending an emergency energy discharge signal to said diverter switch device in response to signal from said comparator circuit;
said diverter switch device causing electrodes of said one or more cells having conditions exceeding said predetermined thresholds to be connected to said energy discharge load.

52. The battery safety circuit as claimed in claim 51 wherein said switch is one or more of the following:
electromechanical relay,
transistor,
semiconductor.

53. The battery safety circuit as claimed in claim 51 wherein said energy discharge load comprises one or more of the following:
resistor,
potentiometer,
capacitor,
lamp,
second electrochemical cell,
electrolytic device,
resistive coil,
inductive coil,
Peltier device,
thermocouple,
thermopile,
piezoelectric device,
sound generating device,
motor,
electromagnet,
phase-change material,
ceramic material,
semiconductor.

54. The battery safety circuit as claimed in claim 51 wherein said memory storage comprises an integrated circuit.

55. The battery safety circuit as claimed in claim 51 wherein said first electrochemical cells are rechargeable.

56. The battery safety circuit as claimed in claim 51 wherein said diverter switch is variable and responsive to said safety circuit which varies said rate at which energy is discharged by controlling said diverter switch.

57. The battery safety circuit as claimed in claim 51 wherein said energy discharge load is a variable resistor controlled by said control circuit such that said rate at which energy is discharged is controlled by varying the resistive load of said energy discharge load in response to said control circuit.

58. The battery safety circuit as claimed in claim 51 wherein said energy discharge load is a variable capacitor controlled by said control circuit such that said rate at which energy is discharged is controlled by varying inductance of said energy discharge load in response to said control circuit.

59. The battery safety circuit as claimed in claim 51 wherein said energy discharge load is a variable transformer controlled by said control circuit such that said rate at which energy is discharged is controlled by varying impedance of said energy discharge load in response to said control circuit.

60. The battery safety circuit as claimed in claim 51 further including an alerting signal device responsively controlled by said control circuit to issue an alerting signal when said emergency energy discharge is activated.

61. The battery safety circuit as claimed in claim 51 wherein said control circuit varies said discharge rate by repeatedly pulsing said diverter switch on and off.

62. An implantable battery comprising:
one or more electrochemical cells;
a charging circuit;
a charging control circuit;
an implanted electronic device receiving its power from said one or more electrochemical cells;
an emergency energy discharge circuit further comprising at least one sensor monitoring at least one of the following conditions of said electrochemical cells:
voltage,
change in voltage,
rate of change in voltage,
current,
change in current,
rate of change in current,
state of charge,
change in state of charge,
rate of change in state of charge,
temperature,
change in temperature,
rate of change in temperature,
impedance,
change in impedance,
rate of change in impedance,
pressure,
change in pressure,
rate of change in pressure,
electrolyte pH,
electrolyte specific gravity,
amount of bulging of battery enclosure,
change in amount of bulging of battery enclosure, and
rate of change of amount of bulging of battery enclosure;
memory storage;
predetermined safety thresholds for said at least one condition stored in said memory storage;
a comparator circuit;
a control circuit;
a diverter switch;
an electrical discharge load;
said comparator circuit comparing said monitored conditions with said stored predetermined safety thresholds and signaling said control circuit whenever said at least one monitored condition exceeds one or more said predetermined thresholds;
said emergency discharge circuit sending an emergency energy discharge signal to said diverter switch in response to signal from said comparator circuit;
said diverter switch causing electrodes of said one or more cells having conditions exceeding said predetermined thresholds to be connected to said energy discharge load.

63. An implantable battery as claimed in claim 62 wherein said discharge load comprises one or more components of said implanted device.

64. An implantable battery as claimed in claim 63 wherein said one or more components of said implanted device is at least one inductive charging coil.

65. An implantable battery as claimed in claim 62 further including an alerting signaling device responsive to said emergency energy discharge circuit to issue an alert when said implantable battery experiences a fault.

66. An implantable battery as claimed in claim 65 wherein said electrical discharge load comprises at least said alerting signaling device.

67. An implantable battery as claimed in claim 66 wherein said alerting signaling device comprises one or more of the following devices:
a radio transmitter,
a lamp,
a light emitting diode,
a sound generator,
a vibrating device.

* * * * *

UNITED STATES PATENT AND TRADEMARK OFFICE
CERTIFICATE OF CORRECTION

PATENT NO. : 6,531,847 B1
DATED : March 11, 2003
INVENTOR(S) : Tsukamoto et al.

It is certified that error appears in the above-identified patent and that said Letters Patent is hereby corrected as shown below:

<u>Title page,</u>
Item [75], change the named inventors from:
"Hisashi Tsukamoto, Saugus, CA (US); Clay Kishiyama, Valencia, CA (US)" to
-- Hisashi Tsukamoto, Saugus, CA (US); Clay Kishiyama, Valencia, CA (US); David Comarow, Las Vegas, NV (US) --

Signed and Sealed this

Fifth Day of August, 2003

JAMES E. ROGAN
*Director of the United States Patent and Trademark Office*